United States Patent
Chiba

(10) Patent No.: US 8,406,020 B2
(45) Date of Patent: Mar. 26, 2013

(54) POWER FACTOR CORRECTION CIRCUIT

(75) Inventor: Akiteru Chiba, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 229 days.

(21) Appl. No.: 12/824,651

(22) Filed: Jun. 28, 2010

(65) Prior Publication Data

US 2011/0007533 A1    Jan. 13, 2011

(30) Foreign Application Priority Data

Jul. 8, 2009    (JP) ................... 2009-161630

(51) Int. Cl.
*H02M 5/42* (2006.01)
*H02M 7/04* (2006.01)
*H02M 7/68* (2006.01)
*H02M 7/217* (2006.01)

(52) U.S. Cl. ........................... 363/89; 363/127

(58) Field of Classification Search .......... 363/70, 363/84, 85, 88, 89, 125–127; 323/205–209, 323/222, 225, 271, 272

See application file for complete search history.

(56) References Cited

U.S. PATENT DOCUMENTS

| 6,320,772 B1* | 11/2001 | Doyama et al. | 363/89 |
| 6,570,366 B1* | 5/2003 | Lin et al. | 363/89 |
| 6,738,274 B2* | 5/2004 | Prasad et al. | 363/127 |
| 2007/0058402 A1* | 3/2007 | Shekhawat et al. | 363/89 |

FOREIGN PATENT DOCUMENTS

JP    7-115774    5/1995

* cited by examiner

*Primary Examiner* — Jue Zhang
(74) *Attorney, Agent, or Firm* — Oblon, Spivak, McClelland, Maier & Neustadt, L.L.P.

(57) ABSTRACT

A power factor correction circuit includes reactors L1 and L2 to accumulate energy of an AC power source and discharge the accumulated energy, a hybrid bridge switch having two diodes D1 and D2 and two switching elements Q1 and Q2 to switch the energy accumulation and energy discharge of the reactors from one to another, a controller 3 to conduct ON-control of the two switching elements according to currents passing through the reactors and OFF-control of the two switching elements according to currents passing through the two switching elements, and a mode changer 11 to change an operation mode of the power factor correction circuit between a discontinuous mode and a critical mode according to a voltage of the AC power source.

6 Claims, 10 Drawing Sheets

POWER FACTOR CORRECTION CIRCUIT

BACKGROUND OF THE INVENTION

1. Field of the Invention

The present invention relates to a power factor correction circuit to correct a power factor when converting an AC input into a DC output.

2. Description of the Related Art

Step-up-type power factor correction circuits have been used to secure a power factor when converting an AC voltage of an AC power source into a DC voltage. For example, Japanese Unexamined Patent Application Publication No. H07-115774 discloses a power source apparatus that arranges high-speed switch elements instead of two rectifying elements on a feedback current passing side of a bridge-type full-wave rectifying circuit and properly controls the high-speed switch elements, to correct a power factor, reduce the number of parts, and increase the conversion efficiency and reliability of the power source apparatus.

The power source apparatus of this related art controls the switch elements based on upper and lower wave segments of a sinusoidal AC line input voltage, to make the waveform and phase of an input current similar to those of the input voltage, thereby correcting a power factor. The related art needs no bridge-type full-wave rectifying circuit, and therefore, causes no loss due to a forward voltage drop of a rectifying diode, thereby improving efficiency.

FIG. 1 is a circuit diagram illustrating a bridge-type power factor correction circuit according to another related art operating in a critical mode. The circuit of FIG. 1 includes reactors L1 and L2, switching elements Q1 and Q2, diodes D1 to D4, capacitors C1 to C3, resistors R1 to R7, half-wave rectifying circuits 1 and 2, and a control circuit 3.

The switching elements Q1 and Q2 are turned on/off at a frequency higher than the frequency of an AC power source AC input, to step-up voltages supplied from main windings L1a and L2a of the reactors L1 and L2.

The control circuit 3 controls the switching of the switching elements Q1 and Q2 in such a way that currents passing through the main windings L1a and L2a of the reactors L1 and L2 have a waveform proportional to the waveform of an AC input voltage of the AC power source AC input, thereby correcting a power factor. The control circuit 3 turns on the switching elements Q1 and Q2 if it is detected according to flyback voltages generated by auxiliary windings L1b and L2b of the reactors L1 and L2 that the currents passing through the main windings L1a and L2a of the reactors L1 and L2 decrease to zero.

The control circuit 3 includes a comparator 4, a one-shot circuit 5, an error amplifier 6, a multiplier 7, a comparator 8, an RS-flip-flop 9, and a driver 10. According to signals to terminals ZCD, CS, FB, and MULT, the control circuit 3 outputs an ON/OFF control signal from a terminal OUT to the switching elements Q1 and Q2.

When the switching elements Q1 and Q2 are turned on, the reactors L1 and L2 accumulate energy, and when the switching elements Q1 and Q2 are turned off, the energy accumulated in the reactors L1 and L2 is stored through the diodes D1 and D2 in the capacitor C2. A voltage across the capacitor C2, i.e., an output voltage is divided by the resistors R3 and R4 and is supplied to the terminal FB of the control circuit 3. In the control circuit 3, the error amplifier 6 compares the voltage at the output voltage detection terminal FB with a reference voltage Vth1, and according to a comparison result, outputs an error voltage to the multiplier 7.

The multiplier 7 multiplies the error voltage from the error amplifier 6 by a voltage at the AC input voltage detecting terminal MULT and outputs a multiplication resultant voltage to the comparator 8. The voltage at the terminal MULT is a voltage formed by rectifying voltages of the main windings L1a and L2a of the reactors L1 and L2 into a pulsating voltage and by dividing the pulsating voltage with the resistors R5 and R6.

The half-wave rectifying circuit 2 half-wave-rectifies voltages generated by the resistors R1 and R2 from currents passing through the switching elements Q1 and Q2 and outputs a voltage to the terminal CS connected to the comparator 8.

The comparator 8 compares the voltage from the half-wave rectifying circuit 2 with the voltage from the multiplier 7, and if the voltage generated by the resistors R1 and R2 is higher than the voltage from the multiplier 7, outputs a signal to a reset terminal R of the RS-flip-flop 9.

The half-wave rectifying circuit 1 half-wave-rectifies flyback voltages generated by the auxiliary windings L1b and L2b from currents passing through the main windings L1a and L2a of the reactors L1 and L2 and provides a rectified voltage through the resistor 7 and terminal ZCD to the comparator 4. The half-wave rectifying circuit 1 removes negative sides of waveforms of different polarities appearing on the auxiliary windings L1b and L2b. Namely, the half-wave rectifying circuit 1 selects only positive-side waveforms in synchronization with the frequency of the AC power source.

The comparator 4 compares the voltage at the terminal ZCD for detecting currents passing through the main windings L1a and L2a of the reactors L1 and L2 with a reference voltage Vth2 and outputs a comparison result signal to the one-shot circuit 5.

If the comparison result signal rises from low to high, the one-shot circuit 5 outputs a low-level signal to a set terminal S of the RS-flip-flop 9. If the comparison result signal falls from high to low, the one-shot circuit 5 outputs a pulse signal having a regular time width to the set terminal S of the RS-flop-flop 9.

Based on the voltage received at the reset terminal R or the set terminal S, the RS-flip-flop 9 carries out a reset operation or a set operation at an output terminal Q thereof. The driver 10 is, for example, a switching circuit using transistors, and based on the voltage at the output terminal Q of the RS-flip-flop 9, turns on/off the switching elements Q1 and Q2.

The control circuit 3 having the above-mentioned configuration achieves a critical mode and detects when flyback voltages generated by the auxiliary windings L1b and L2b of the reactors L1 and L2 become zero, to turn on the switching elements Q1 and Q2. When energy accumulated in the reactors L1 and L2 is discharged to nearly zero, the control circuit 3 starts to accumulate energy in the reactors L1 and L2, thereby maintaining a high utilization rate of the reactors L1 and L2 and making an input current of the AC power source have a sinusoidal waveform that follows the waveform of an input voltage of the AC power source, to correct a power factor.

SUMMARY OF THE INVENTION

If the AC input voltage of the AC power source is low such as 100 V in the related art of FIG. 1, the reactors L1 and L2 and parasitic capacitance of the switching elements Q1 and Q2 or a resonant capacitor (not illustrated) between the drain and source of each switching element resonate to realize high efficiency.

According to the related art, an amplitude of free oscillation is determined by inductance values of the reactors L1 and L2, capacitance values of the resonant capacitors, or parasitic capacitance values of the switching elements Q1 and Q2. Accordingly, if the AC input voltage is high such as 200V, voltages of the switching elements due to the free oscillation will not sometimes decrease to zero. Then, the quasi-resonance is not carried out and hard switching is carried out.

FIG. 2 is a waveform diagram illustrating operation of the power factor correction circuit according to the related art of FIG. 1. In FIG. 2, the switching elements Q1 and Q2 are turned on before the voltages of the switching elements decrease to zero. Then, a short-circuit current of the resonant capacitor (or the parasitic capacitance) at the time of turn-ON increases a switching loss and deteriorates efficiency. In addition, the power factor correction circuit of the related art operating in the critical mode increases a switching frequency when the AC input voltage is high or when load is light. This further increases a switching loss per unit time.

To solve the problems of the related art, the present invention provides a power factor correction circuit capable of realizing high efficiency without regard to the magnitude of load or the level of an AC input voltage.

According to an aspect of the present invention, the power factor correction circuit includes a reactor to accumulate energy of an AC power source and discharge the accumulated energy, a hybrid bridge switch having two diodes and two switching elements to switch the energy accumulation and energy discharge of the reactor from one to another, a controller to conduct ON-control of the two switching elements according to a current passing through the reactor and OFF-control of the two switching elements according to currents passing through the two switching elements, and a mode changer to change an operation mode of the power factor correction circuit between a discontinuous mode and a critical mode according to a voltage of the AC power source.

DESCRIPTION OF THE PREFERRED EMBODIMENT

Power factor correction circuits according to embodiments of the present invention will be explained in detail with reference to the drawings.

Embodiment 1

Figure 1:
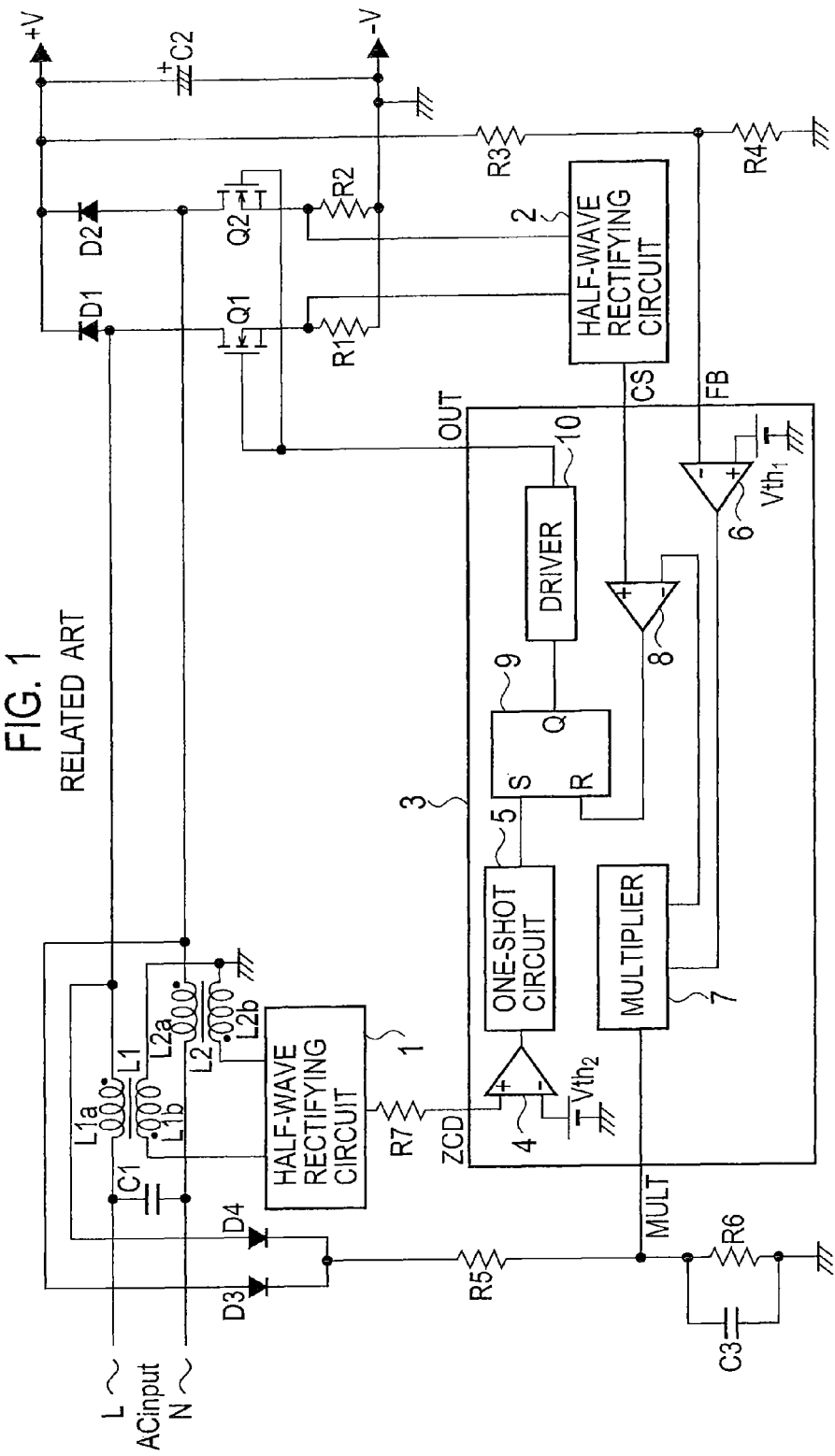
FIG. 1 is a circuit diagram illustrating a bridge-type power factor correction circuit according to a related art operating in a critical mode.
Figure 2:
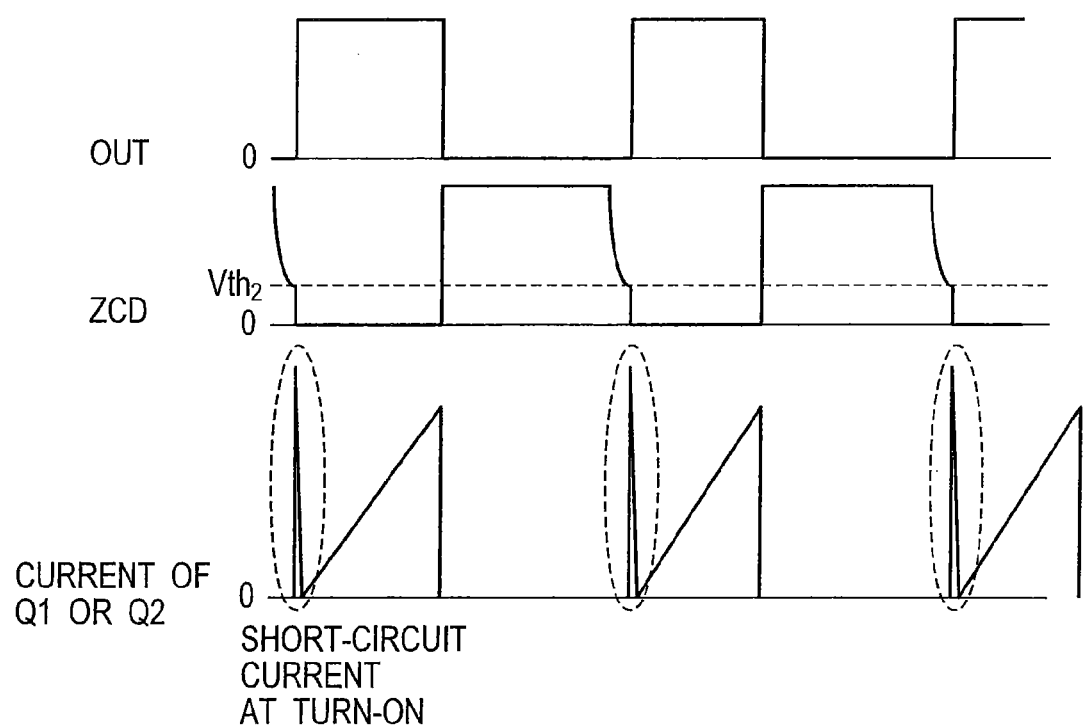
FIG. 2 is a waveform diagram illustrating operation of the power factor correction circuit of FIG. 1.
Figure 3:
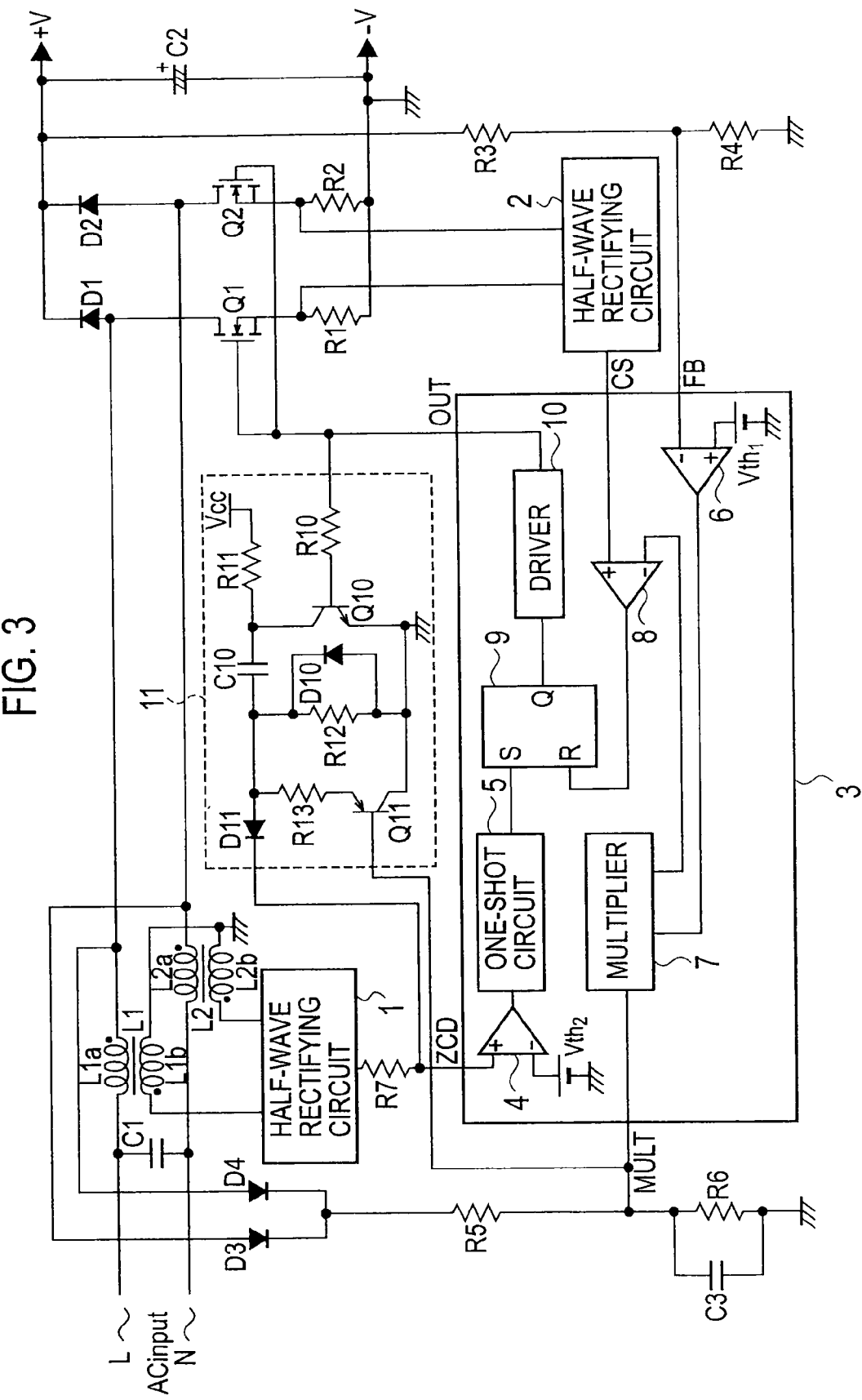
FIG. 3 is a circuit diagram illustrating a power factor correction circuit according to Embodiment 1 of the present invention.

FIG. 3 is a circuit diagram illustrating a power factor correction circuit according to Embodiment 1 of the present invention. The power factor correction circuit includes reactors L1 and L2, switching elements Q1 and Q2, diodes D1 to D4, capacitors C1 to C3, resistors R1 to R7, half-wave rectifying circuits 1 and 2, a control circuit 3, and a mode changer 11. Embodiment 1 differs from the related art of FIG. 1 in that Embodiment 1 additionally employs the mode changer 11. In FIG. 3, the same or equivalent elements as those of FIG. 1 are represented with the same reference marks to omit a repetition of explanation.

The reactors L1 and L2 accumulate energy from an AC power source "AC input" and discharge the accumulated energy as output currents from main windings L1a and L2a of the reactors L1 and L2. The reactors L1 and L2 have auxiliary windings L1b and L2b that are grounded at one ends and are connected to the half-wave rectifying circuit 1 at the other ends, like the related art of FIG. 1.

The diodes D1 and D2 and switching elements Q1 and Q2 are the "hybrid bridge switch" as stipulated in the claims, to switch the energy accumulation and energy discharge of the reactors L1 and L2 from one to another.

The switching elements Q1 and Q2 operate at a frequency higher than the frequency of the AC power source AC input, to step-up voltages supplied from the main windings L1a and L2a of the reactors L1 and L2 and output the stepped-up voltages. According to Embodiment 1, the switching elements Q1 and Q2 are FETs (field effect transistors). This, however, does not limit the present invention.

The resistors R1 and R2 are connected in series with the switching elements Q1 and Q2, respectively, to convert currents passing through the switching elements Q1 and Q2 into voltages, which are supplied through the half-wave rectifying circuit 2 and a terminal CS to a comparator 8 in the control circuit 3.

The control circuit 3 corresponds to the "controller" stipulated in the claims and carries out ON-control of the two switching elements Q1 and Q2 based on currents passing through the main windings L1a and L2a of the reactors L1 and L2. In addition, the control circuit 3 carries out OFF-control of the switching elements Q1 and Q2 based on currents passing through the switching elements Q1 and Q2. The configuration of the control circuit 3 is the same as that of the related art explained with reference to FIG. 1, and therefore, the explanation thereof will not be repeated.

The mode changer 11 corresponds to the "mode changer" stipulated in the claims and changes the mode of operation of the power factor correction circuit between a discontinuous mode and a critical mode based on an AC voltage of the AC power source AC input.

The mode changer 11 includes diodes D10 and D11, resistors R10 to R13, switching elements Q10 and Q11, a capacitor C10, and a power source Vcc. The power source Vcc and resistor R11 are replaceable with a constant current source.

If the AC input voltage is equal to or higher than a predetermined value, the mode changer 11 forcibly adjusts the ON-control timing of the control circuit 3 in such a way as to fix an OFF period of the switching elements Q1 and Q2 and operate the power factor correction circuit in the discontinuous mode.

If the AC input voltage is lower than the predetermined value, the mode changer 11 terminates the forcible adjustment of the ON-control timing of the control circuit 3 in such a way as to make the OFF period of the switching elements Q1 and Q2 variable and operate the power factor correction circuit in the critical mode.

The capacitor C10 and resistor R12 form a time constant circuit to delay the ON-control timing of the control circuit 3 by a predetermined time. Operation of the time constant circuit will be explained later.

The switching element Q10 corresponds to the "charge/discharge part" stipulated in the claims. In an ON period of the switching elements Q1 and Q2, the switching element Q10 discharges the capacitor C10, and in an OFF period of the switching elements Q1 and Q2, charges the capacitor C10. According to Embodiment 1, the switching element Q10 is an npn-type bipolar transistor whose base is connected through the resistor R10 to a terminal OUT of the control circuit 3. Accordingly, the switching element Q10 turns on/off in synchronization with the ON/OFF of the switching elements Q1 and Q2.

The resistor R13 and switching element Q11 form a series circuit that corresponds to the "mode determination part" stipulated in the claims and is connected in parallel with the resistor R12. According to the present embodiment, the switching element Q11 is a pnp-type bipolar transistor whose base is connected to a terminal MULT of the control circuit 3. Accordingly, the switching element Q11 turns on when the AC input voltage is lower than the predetermined value.

In the mode changer 11, the switching element Q11 turns off if the AC input voltage is equal to or higher than the predetermined value. Then, a voltage generated by the resistor R12 is supplied through the diode D11 to a terminal ZCD of the control circuit 3, which detects currents passing through the main windings L1a and L2a of the reactors L1 and L2, thereby forcibly adjusting the ON-control timing of the control circuit 3, fixing an OFF period of the switching elements Q1 and Q2, and operating the power factor correction circuit in the discontinuous mode.

In the mode changer 11, the switching element Q11 turns on if the AC input voltage is lower than the predetermined value. Then, the voltage of the resistor R12 is not supplied to the terminal ZCD of the control circuit 3, so that the OFF period of the switching elements Q1 and Q2 becomes variable and the power factor correction circuit operates in the critical mode.

Operation of the power factor correction circuit according to the present embodiment having the above-mentioned configuration will be explained. Operation of the power factor correction circuit other than the mode changer 11 is the same as that of the related art explained with reference to FIG. 1. Namely, the power factor correction circuit operates to make an AC input current have a sinusoidal waveform that follows the waveform of an AC input voltage, thereby correcting a power factor.

As explained above, the power factor correction circuit of the related art illustrated in FIG. 1 operates in the critical mode. On the other hand, the power factor correction circuit of the present embodiment having the mode changer 11 operates in the discontinuous mode if an AC input voltage is high. This will be explained in detail.

Figure 4:
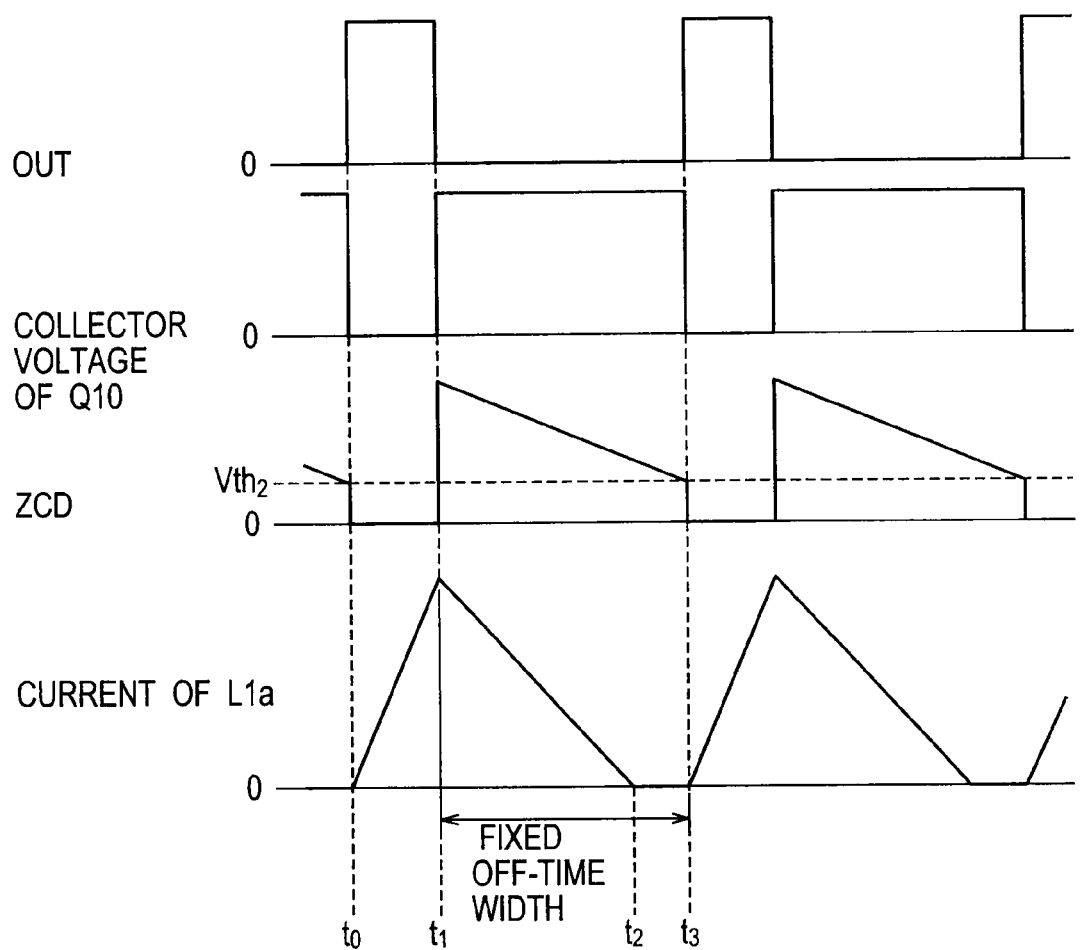
FIG. 4 is a waveform diagram illustrating operation of the power factor correction circuit according to Embodiment 1.

FIG. 4 is a waveform diagram illustrating operation of the power factor correction circuit according to the present embodiment in the discontinuous mode. The waveform diagram of FIG. 4 is of a period in which an L-phase voltage (voltage on a non-grounded side) of the AC power source is positive. In FIG. 4, the L-phase voltage is high so as to operate the power factor correction circuit in the discontinuous mode. Namely, the L-phase voltage is equal to or higher than the predetermined value, and therefore, the voltage at the terminal MULT of the control circuit 3 is high to turn off the switching element Q11 of the mode changer 11. Accordingly, the voltage of the resistor R12 of the mode changer 11 is supplied through the diode D11 to the terminal ZCD of the control circuit 3.

At time t0, a signal at the terminal OUT of the control circuit 3 is high to turn on the switching elements Q1 and Q2. At this time, the switching element Q10 is also turned on, and therefore, a collector voltage of the switching element Q10 becomes low. Namely, the switching element Q10 outputs an inverted signal of the signal at the terminal OUT.

As illustrated in FIG. 4, a current passing through the main winding L1a of the reactor L1 gradually increases while the switching element Q1 is being ON. As a result, a current passing through the switching element Q1 gradually increases.

When a voltage generated by the resistor R1 becomes higher than an output voltage from a multiplier 7, the comparator 8 in the control circuit 3 outputs a high-level signal to a reset terminal R of an RS-flip-flop 9, thereby the signal at the terminal OUT goes down to low level (at time t1).

The low-level signal from the terminal OUT turns off the switching element Q1, and therefore, energy accumulated in the reactor L1 is discharged as an output current from the main winding L1a of the reactor L1 and the current passing through the main winding L1a of the reactor L1 gradually decreases.

The low-level signal from the terminal OUT also turns off the switching element Q10, and therefore, the collector of the switching element Q10 provides a voltage of the power source Vcc. This results in generating a voltage across the resistor R12 of the time constant circuit. The voltage of the resistor R12 is supplied through the diode D11 to the terminal ZCD. At the same time, the capacitor C10 is charged.

As the capacitor C10 is charged, the voltage across the resistor R12 decreases, and therefore, the voltage to the terminal ZCD gradually decreases as illustrated in FIG. 4.

If the power factor correction circuit is in the critical mode and if the voltage at the terminal ZCD, which is based on currents passing through the main windings L1a and L2a of the reactors L1 and L2, becomes zero, the control circuit 3 provides a high-level signal from the terminal OUT to turn on the switching elements Q1 and Q2.

According to the present embodiment, however, the power factor correction circuit is in the discontinuous mode due to the voltage added to the terminal ZCD when the current passing through the main winding L1a becomes zero, as illustrated in FIG. 4. Namely, even if the currents passing through the main windings L1a and L2a of the reactors L1 and L2 become zero at time t2, the control circuit 3 keeps the terminal OUT low until the voltage at the terminal ZCD decreases below the reference value Vth2.

The time constant circuit having the capacitor C10 and resistor R12 applies a voltage to the terminal ZCD as mentioned above, to delay the ON-control timing of the control circuit 3 by a predetermined time and fix an OFF-time width of the switching elements Q1 and Q2. At time t3, the voltage at the terminal ZCD decreases lower than the reference value Vth2, and the control circuit 3 outputs a high-level signal from the terminal OUT to turn on the switching elements Q1, Q2, and Q10.

When the switching element Q10 turns on, the capacitor C10 is discharged. At this time, the diode D10 connected in parallel with the resistor R12 quickly discharges the capacitor C10.

Figure 5:
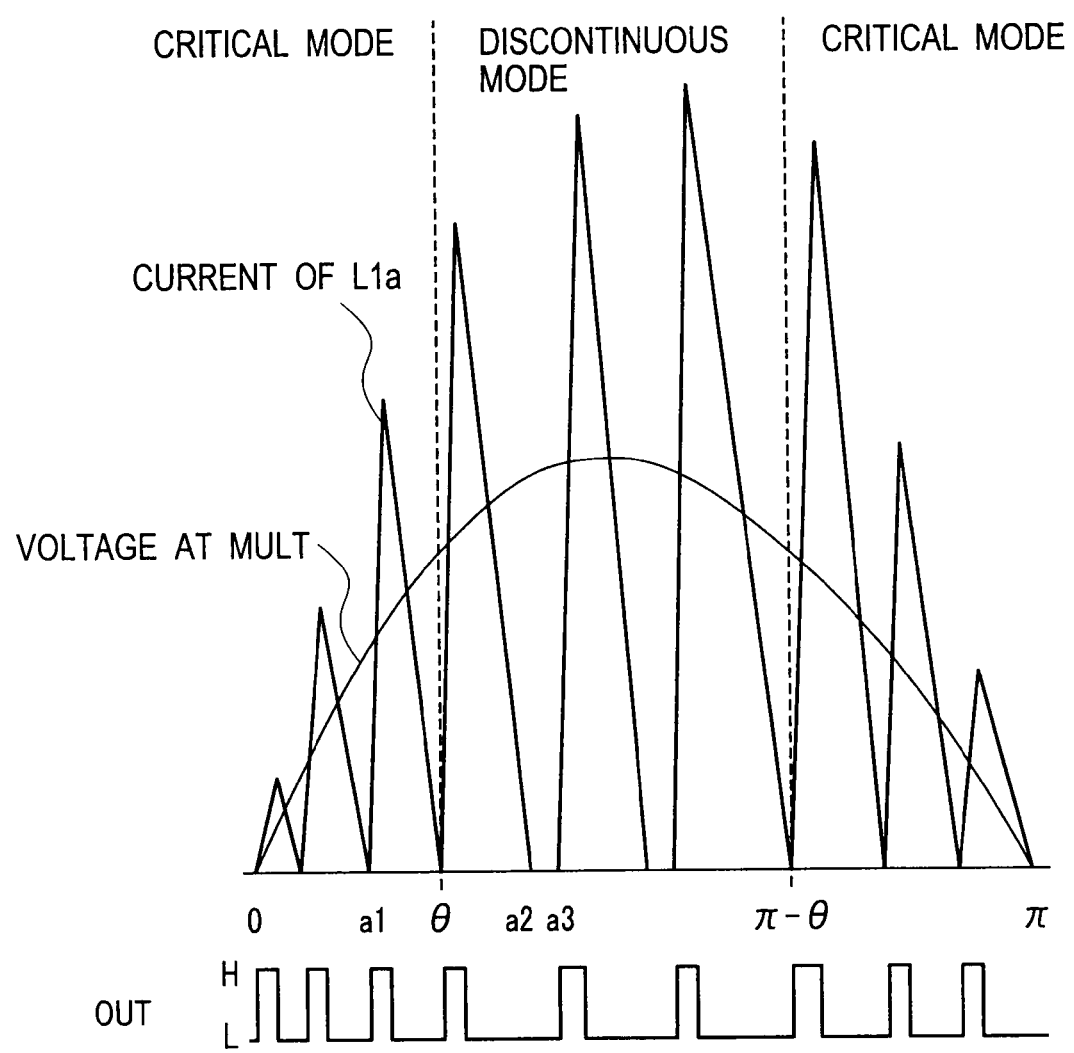
FIG. 5 is a waveform diagram illustrating critical and discontinuous modes that are changed from one to another in the power factor correction circuit according to Embodiment 1.
Figure 6:
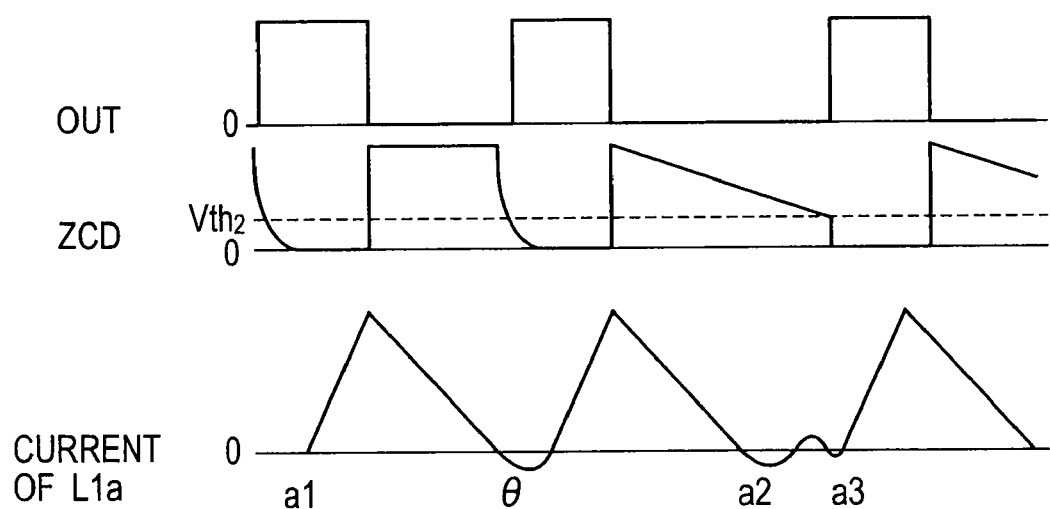
FIG. 6 is a waveform diagram illustrating a mode changing operation in the power factor correction circuit according to Embodiment 1.

Changing the critical mode and discontinuous mode from one to another will be explained. FIG. 5 is a waveform diagram illustrating the critical mode and discontinuous mode of the power factor correction circuit according to the present embodiment. This waveform diagram is of a period in which an L-phase voltage of the AC power source is positive. FIG. 6 is a waveform diagram illustrating part of the diagram of FIG. 5 and a voltage at the terminal ZCD.

In the phase range of 0 to θ of the AC input voltage illustrated in FIG. 5, the AC input voltage is low, i.e., the voltage at the terminal MULT is low. As a result, the switching element Q11 is turned on to decrease a voltage across the resistor R12. The mode changer 11, therefore, prevents the voltage of the resistor R12 from being supplied to the control circuit 3. Namely, the forcible adjustment of the ON-control timing of the control circuit 3 carried out by the mode changer 11 ends and the power factor correction circuit operates in the critical mode.

As illustrated in FIGS. 4 and 5, the current passing through the main winding L1a of the reactor L1 decreases, and when the voltage at the terminal ZCD decreases below the reference value Vth2, the control circuit 3 outputs a high-level signal from the terminal OUT to turn on the switching elements Q1 and Q2.

The AC input voltage increases, and at a phase of θ, the voltage at the terminal MULT exceeds a predetermined value, to turn off the switching element Q11. Then, the mode changer 11 outputs the voltage of the resistor 12 to the terminal ZCD of the control circuit 3, to forcibly adjust the ON-control timing of the switching elements Q1 and Q2 and fix an OFF period of the switching elements Q1 and Q2. Consequently, the power factor correction circuit operates in the discontinuous mode.

Even if the current passing through the main winding L1a of the reactor L1 decreases close to zero at a phase of a2, the voltage at the terminal ZCD is equal to or higher than the reference value Vth2 as illustrated in FIGS. 5 and 6, and therefore, the control circuit 3 provides no high-level signal from the terminal OUT. At a phase of a3, the voltage at the terminal ZCD decreases below the reference value Vth2 and the control circuit 3 outputs a high-level signal from the terminal OUT to turn on the switching elements Q1 and Q2.

Generally, an ON/OFF time of a switching element in the critical mode is expressed as follows:

$$t_{on} = \frac{2LP_0}{\eta V_{rms}^2}, \quad (1)$$

$$t_{off} = \frac{1}{\frac{V_0}{\sqrt{2}\, V_{rms}|\sin\theta|} - 1} t_{on}, \quad (2)$$

where ton is an ON time (sec) of the switching element, toff is an OFF time (sec) of the switching element, L is an inductance (H) of a reactor, η is an efficiency (0<η<1), Po is an output power (W), Vrms is an AC input voltage (V), Vo is a DC output voltage (V), and θ is a phase angle (rad).

Accordingly, the power factor correction circuit of the related art has the problem that a switching frequency increases as an effective value of the AC input voltage Vrms becomes larger, to increase a switching loss per unit time.

On the other hand, the power factor correction circuit according to the present embodiment is capable of extending an OFF time of the switching elements Q1 and Q2 based on a time constant provided by the resistor R12 and capacitor C10, to lower a switching frequency, decrease a loss, and increase efficiency.

At a phase angle of π–θ in FIG. 5, the voltage at the terminal MULT decreases below the predetermined voltage and the switching element Q11 turns on. Then, the mode changer 11 terminates the forcible adjustment of the ON-control timing of the control circuit 3, to operate the power factor correction circuit in the critical mode.

In FIGS. 4, 5, and 6, the L-phase voltage of the AC power source is positive. Operation of the present embodiment in a period in which the N-phase voltage (voltage on a grounded side) of the AC power source is positive is similar. In the case of the N-phase voltage, the current L1a illustrated in FIGS. 4, 5, and 6 is considered as a current L2a.

The resistors R12 and R13 may be adjusted to optionally change the critical mode and discontinuous mode from one to another at the AC input phase angles of θ and π–θ so as to realize an optimum power factor.

In this way, the power factor correction circuit according to Embodiment 1 realizes, with an addition of a small number of parts, high efficiency without regard to the level of an AC input voltage. Namely, the power factor correction circuit according to Embodiment 1 operates in the critical mode when the AC input voltage is low and in the discontinuous mode at a lowered switching frequency when the AC input voltage is high, thereby decreasing a loss per unit time and increasing efficiency.

Operating in the discontinuous mode at a lowered switching frequency when the AC input voltage is high, the power factor correction circuit according to Embodiment 1 allows substantially the same overcurrent value to be set for both high and low AC input voltage zones. Namely, the power factor correction circuit according to Embodiment 1 can employ a fixed overcurrent value without regard to the level of an AC input voltage.

The power factor correction circuit of Embodiment 1 employs the hybrid bridge switch for a main circuit, and therefore, eliminates the need of a full-wave rectifying circuit and improves efficiency, like the power source apparatus disclosed in the Japanese Unexamined Patent Application Publication No. H07-115774.

Figure 7:
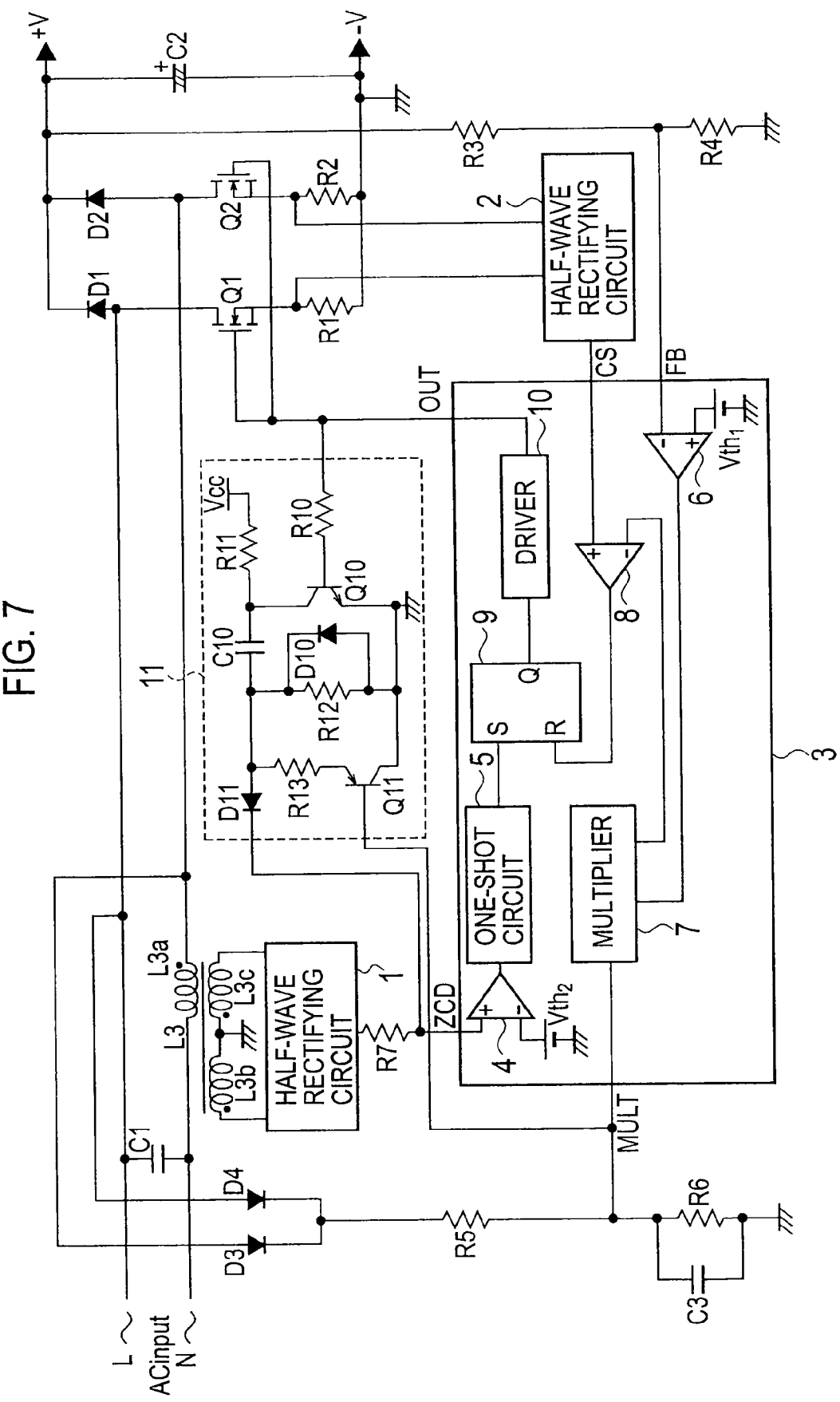
FIG. 7 is a circuit diagram illustrating a power factor correction circuit according to a modification of Embodiment 1.

FIG. 7 is a circuit diagram illustrating a power factor correction circuit according to a modification of Embodiment 1 of the present invention. The modification of FIG. 7 differs from Embodiment 1 of FIG. 3 in that the modification employs a reactor L3 only for an N-phase instead of the reactors L1 and L2 for L- and N-phases because it is not always necessary to arrange reactors for both the L- and N-phases. A reactor may be arranged only for the N-phase as illustrated in FIG. 7, or only for the L-phase.

The reactor L3 of the power factor correction circuit illustrated in FIG. 7 employs auxiliary windings L3b and L3c to detect a current passing through the reactor without regard to whether the N-phase voltage is positive or negative. Accordingly, operation of the power factor correction circuit of FIG. 7 is the same as that of FIG. 3.

The power factor correction circuit of FIG. 7 provides the same effect as that of FIG. 3, and in addition, employs only one reactor to reduce the cost.

Figure 8:
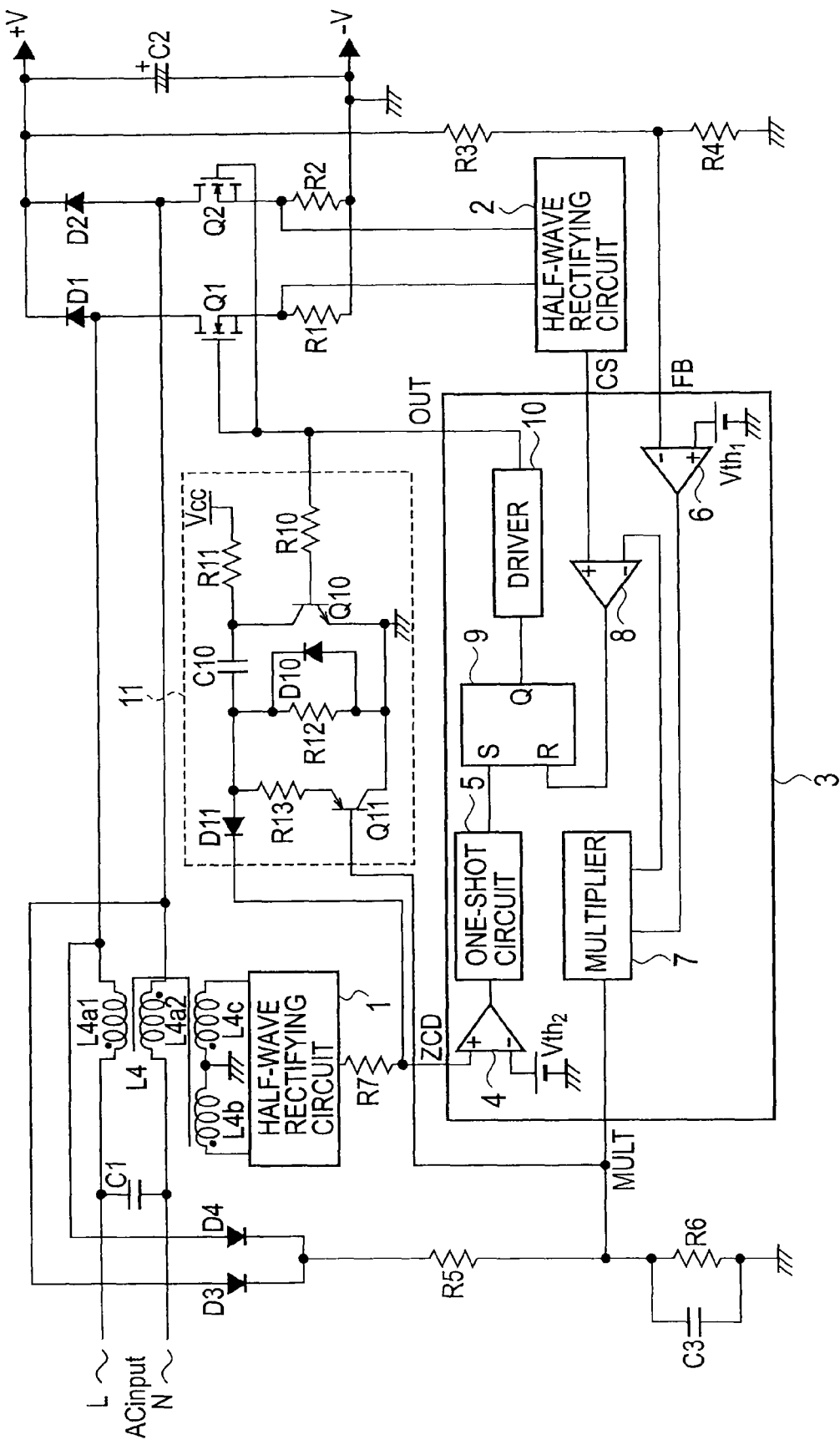
FIG. 8 is a circuit diagram illustrating a power factor correction circuit according to another modification of Embodiment 1.

FIG. 8 is a circuit diagram illustrating a power factor correction circuit according to another modification of Embodiment 1 of the present invention. The power factor correction circuit of FIG. 8 arranges a reactor for each of the L- and N-phases like the power factor correction circuit of FIG. 3. However, the reactor L4 of FIG. 8 is single to reduce the cost, like the modification of FIG. 7.

Embodiment 2

Figure 9:
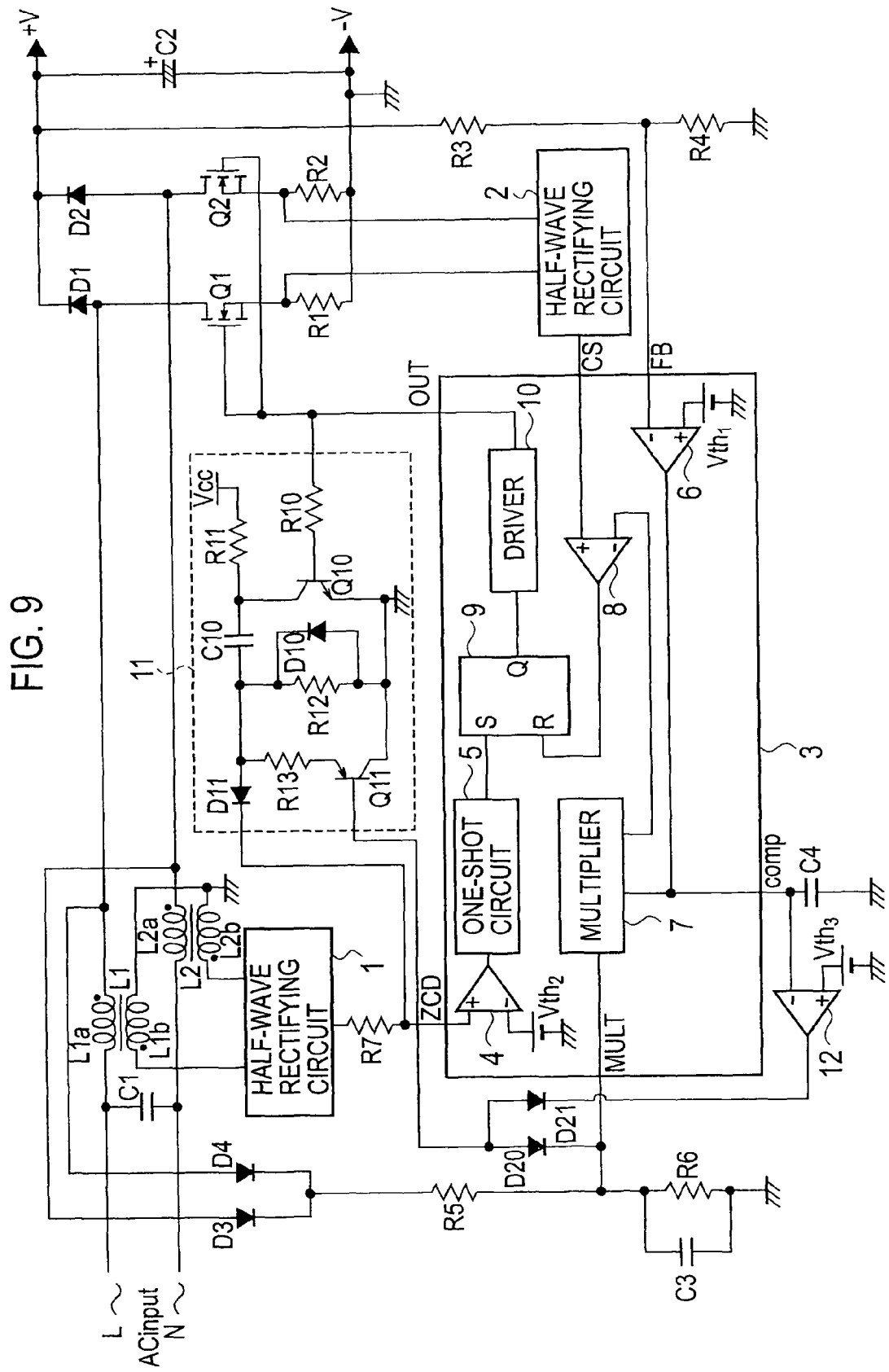
FIG. 9 is a circuit diagram illustrating a power factor correction circuit according to Embodiment 2 of the present invention.

FIG. 9 is a circuit diagram illustrating a power factor correction circuit according to Embodiment 2 of the present invention. Embodiment 2 differs from Embodiment 1 in that Embodiment 2 additionally employs diodes D20 and D21, a comparator 12, and a capacitor C4.

In FIG. 9, an error amplifier 6 in a control circuit 3 compares a voltage received through a terminal FB, which detects an output voltage, with a reference voltage Vth1 and outputs an error voltage to a phase compensation terminal "comp" and a multiplier 7.

When load is in light condition, the voltage to the terminal FB increases, and therefore, the output from the error amplifier 6 decreases to decrease the voltage at the terminal comp.

A mode changer 11 according to Embodiment 2 detects the voltage at the terminal comp, to determine whether or not it is in a light load zone. According to the determination, the mode changer 11 changes a mode. Namely, the mode changer 11 changes the discontinuous mode and critical mode from one to another based on not only a voltage at a terminal MULT that detects an AC input voltage but also an output power from a hybrid bridge switch.

Between the terminal comp and the ground, the capacitor C4 is connected. The terminal comp is connected to a negative input terminal (depicted by "−") of the comparator 12. A positive input terminal (depicted by "+") of the comparator 12 is connected to a voltage source that supplies a reference voltage Vth3. An output terminal of the comparator 12 is connected through the diode D21 to a base of a switching element Q11 of the mode changer 11.

The diode D20 is arranged between the switching element Q11 and the terminal MULT. The diodes D20 and D21 function to prevent a current from passing between the terminal MULT and the output terminal of the comparator 12. In addition, the diodes D20 and D21 allow the switching element Q11 to be turned on/off according to one of the voltages from the output terminal of the comparator 12 and the terminal MULT of the control circuit 3.

If the voltage at the phase compensation signal terminal comp that is based on an output voltage from the hybrid bridge switch is lower than the predetermined value Vth3, the mode changer 11 determines that load is light and selects the discontinuous mode. If the voltage at the phase compensation signal terminal comp is equal to or higher than the predetermined value Vth3, the mode changer 11 determines that load is heavy and selects the critical mode.

Namely, if the voltage at the terminal comp is lower than the predetermined value Vth3, the switching element Q11 of the mode changer 11 turns off, and therefore, a voltage generated by a resistor R12 is supplied through a diode D11 to a terminal ZCD of the control circuit 3, to forcibly adjust the ON-control timing of the control circuit 3, fix an OFF period of switching elements Q1 and Q2, and operate the power factor correction circuit in the discontinuous mode.

If the voltage at the terminal comp is equal to or higher than the predetermined value Vth3, the switching element Q11 of the mode changer 11 turns on, to prevent the voltage of the resistor R12 from being supplied to the terminal ZCD of the control circuit 3, make the OFF period of the switching elements Q1 and Q2 variable, and operate the power factor correction circuit in the critical mode.

The remaining configuration of the present embodiment is the same as that of Embodiment 1, and therefore, a repetition of explanation is avoided.

Operation of the power factor correction circuit according to the present embodiment is basically the same as that of Embodiment 1 except that Embodiment 2 additionally changes the critical mode and discontinuous mode from one to another according to whether load is light or heavy. This will be explained in more detail.

Figure 10:
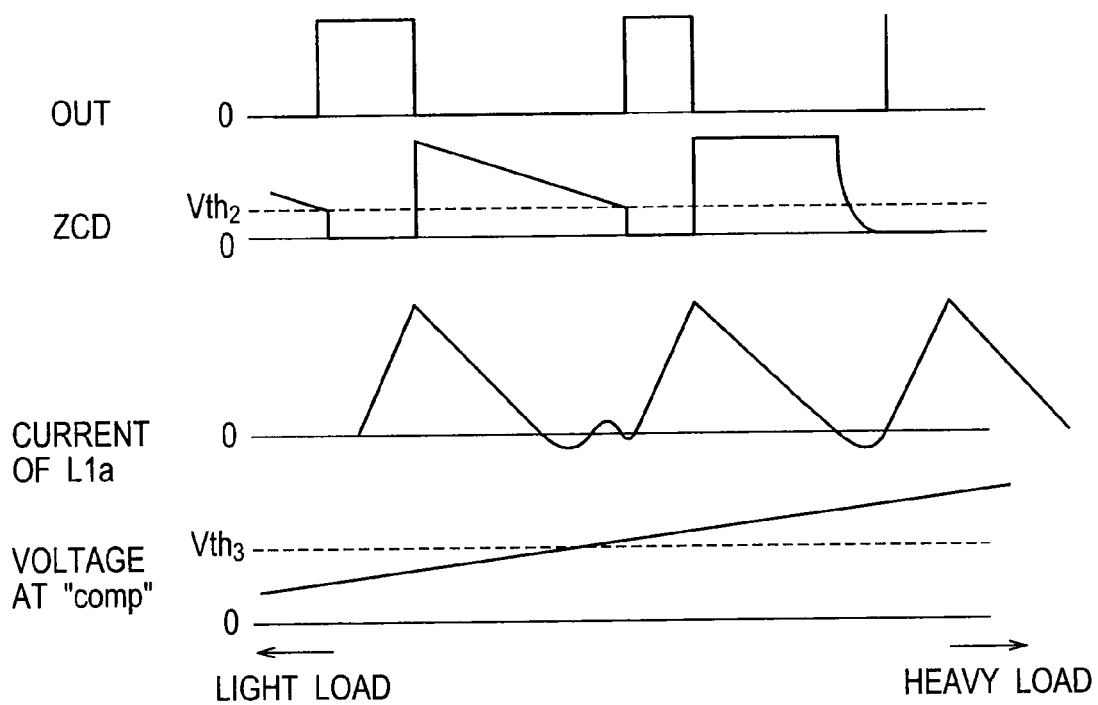
FIG. 10 is a waveform diagram illustrating operation of the power factor correction circuit according to Embodiment 2.

FIG. 10 is a waveform diagram illustrating operation of the power factor correction circuit according to the present embodiment. This waveform diagram is of a period in which an L-phase voltage of the AC power source is positive. Operation of the present embodiment in a period in which an N-phase voltage of the AC power source is positive is similar to that of FIG. 10 with a current L1a of FIG. 10 being read as a current L2a.

When load is in light condition, a voltage supplied to the terminal FB increases to decrease an output level of the error amplifier 6 and a voltage at the terminal "comp". If the voltage at the terminal comp is lower than the predetermined value Vth3, the output terminal of the comparator 12 provides a voltage, and therefore, no current passes through the diode D21. As a result, the switching element Q11 turns off and a voltage generated by the resistor R12 is supplied through the diode D11 to the terminal ZCD of the control circuit 3. Then, the mode changer 11 forcibly adjusts the ON-control timing of the control circuit 3, to fix an OFF period of the switching elements Q1 and Q2 and operate the power factor correction circuit in the discontinuous mode.

Namely, if the voltage at the phase compensation signal terminal comp that is based on an output from the hybrid bridge switch is lower than the predetermined value Vth3, the mode changer 11 determines that load is in light condition and selects the discontinuous mode.

When load is in heavy condition, the voltage to the terminal FB decreases to increase an output level of the error amplifier 6 and a voltage at the terminal comp. If the voltage at the terminal comp is equal to or higher than the predetermined value Vth3, no voltage appears at the output terminal of the comparator 12, and therefore, the diode D21 becomes conductive to turn on the switching element Q11. This results in decreasing the voltage of the resistor R12 and the mode changer 11 releases the forcible adjustment of the ON-control timing of the control circuit 3 and operates the power factor correction circuit in the critical mode.

Namely, if the voltage at the phase compensation signal terminal comp that is based on an output from the hybrid bridge switch is equal to or higher than the predetermined value Vth3, the mode changer 11 determines that load is in heavy condition and selects the critical mode.

The mode changer 11 of the present embodiment also changes the discontinuous and critical modes from one to another based on the level of an AC input voltage, like Embodiment 1. Namely, Embodiment 2 selects the critical mode if load is heavy or if the AC input voltage is low and the discontinuous mode if load is light or if the AC input voltage is high.

The remaining operation of Embodiment 2 is the same as that of Embodiment 1 illustrated in FIG. 3, and therefore, a repetition of explanation is omitted.

In this way, the power factor correction circuit according to Embodiment 2 of the present invention provides the same effect as Embodiment 1. In addition, Embodiment 2 realizes, only by adding a small number of parts, high efficiency without regard to the magnitude of load. Namely, the power factor correction circuit according to Embodiment 2 operates in the critical mode in medium to heavy load zones and in the discontinuous mode at a lowered switching frequency in a light load zone, thereby realizing high efficiency in every load zone.

The mode changer 11 characteristic to the present invention selects a proper operation mode based on the level of an AC input voltage or the magnitude of load, thereby realizing a detailed operation depending on situations to achieve high efficiency.

In this way, the power factor correction circuit according to the present invention is capable of realizing high efficiency without regard to the magnitude of load or the level of an AC input voltage.

The present invention is applicable to power factor correction circuits of switching power source apparatuses that convert an AC input into a DC output.

This application claims benefit of priority under 35 USC §119 to Japanese Patent Application No. 2009-161630, filed on Jul. 8, 2009, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A power factor correction circuit comprising:
   a reactor configured to accumulate energy of an AC power source and discharge the accumulated energy;
   a hybrid bridge switch having two diodes and two switching elements and configured to switch the energy accumulation and energy discharge of the reactor from one to another;
   a controller configured to conduct ON-control of the two switching elements according to a current passing through the reactor and OFF-control of the two switching elements according to currents passing through the two switching elements; and
   a mode changer configured to change an operation mode of the power factor correction circuit between a discontinuous mode and a critical mode according to a voltage of the AC power source, wherein:
   the mode changer comprises:
   a time constant circuit including a resistor and a capacitor and configured to delay the ON-control timing of the controller by a predetermined time;
   a charge/discharge part configured to discharge the capacitor in an ON period of the two switching elements and charge the capacitor in an OFF period of the two switching elements; and
   a mode determination part configured to output, if the voltage of the AC power source is equal to or higher than a predetermined value, a voltage generated by the resistor to a terminal of the controller that detects the current passing through the reactor, and if the voltage of the AC power source is lower than the predetermined value, prevent the voltage generated by the resistor from being outputted to the controller; and
   the mode changer operates the power factor correction circuit in:
   (i) the discontinuous mode if the voltage of the AC power source is equal to or higher than a predetermined value, by forcibly adjusting the ON-control timing of the controller so as to fix an OFF period of the two switching elements; and
   (ii) the critical mode if the voltage of the AC power source is lower than the predetermined value, by releasing the forcible adjustment of the ON-control timing of the controller so as to make the OFF period of the two switching elements variable.

2. A power factor correction circuit comprising:
   a reactor configured to accumulate energy of an AC power source and discharge the accumulated energy;
   a hybrid bridge switch having two diodes and two switching elements and configured to switch the energy accumulation and energy discharge of the reactor from one to another;
   a controller configured to conduct ON-control of the two switching elements according to a current passing through the reactor and OFF-control of the two switching elements according to currents passing through the two switching elements; and
   a mode changer configured to change an operation mode of the power factor correction circuit between a discontinuous mode and a critical mode according to a voltage of the AC power source, wherein
   the mode changer comprises:
   a time constant circuit including a resistor and a capacitor and configured to delay the ON-control timing of the controller by a predetermined time;
   a charge/discharge part configured to discharge the capacitor in an ON period of the two switching elements and charge the capacitor in an OFF period of the two switching elements; and
   a mode determination part configured to output, if the voltage of the AC power source is equal to or higher than a predetermined value, a voltage generated by the resistor to a terminal of the controller that detects the current passing through the reactor, and if the voltage of the AC power source is lower than the predetermined value, prevent the voltage generated by the resistor from being outputted to the controller.

3. The power factor correction circuit of claim 2, wherein the mode changer is further configured to change the discontinuous mode and critical mode from one to another according to an output voltage from the hybrid bridge switch.

4. The power factor correction circuit of claim 1, wherein the mode changer is further configured to change the discontinuous mode and critical mode from one to another according to an output voltage from the hybrid bridge switch.

5. The power factor correction circuit of claim 3, wherein the mode changer is configured to:
   (i) determine that load is light if the voltage of a phase compensation signal that is based on the output voltage from the hybrid bridge switch is lower than a predetermined value and select the discontinuous mode; and
   (ii) determine that load is heavy if the voltage of the phase compensation signal is equal to or higher than the predetermined value and select the critical mode.

6. The power factor correction circuit of claim 4, wherein the mode changer is configured to:
   (i) determine that load is light if the voltage of a phase compensation signal that is based on the output voltage from the hybrid bridge switch is lower than a predetermined value and select the discontinuous mode; and
   (ii) determine that load is heavy if the voltage of the phase compensation signal is equal to or higher than the predetermined value and select the critical mode.

* * * * *